(12) United States Patent
Okumura et al.

(10) Patent No.: US 7,777,766 B2
(45) Date of Patent: Aug. 17, 2010

(54) IMAGE DISPLAY APPARATUS AND METHOD

(75) Inventors: Haruhiko Okumura, Kanagawa-ken (JP); Takashi Sasaki, Kanagawa-ken (JP); Aira Hotta, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 833 days.

(21) Appl. No.: 11/714,233

(22) Filed: Mar. 6, 2007

(65) Prior Publication Data
US 2007/0229557 A1    Oct. 4, 2007

(30) Foreign Application Priority Data
Mar. 29, 2006    (JP)    ............... P2006-091694

(51) Int. Cl.
*G09G 5/02*    (2006.01)
(52) U.S. Cl. .............. 345/698; 345/699; 345/660
(58) Field of Classification Search .............. 345/3.3, 345/7, 9, 80, 660–671, 698–699; 351/224; 349/149–150; 382/254, 256
See application file for complete search history.

(56) References Cited

U.S. PATENT DOCUMENTS

| 4,790,028 | A | * | 12/1988 | Ramage | ............. | 382/298 |
| 5,208,872 | A | * | 5/1993 | Fisher | ............. | 382/300 |
| 5,670,984 | A | * | 9/1997 | Robertson et al. | ............. | 345/585 |
| 5,726,670 | A | * | 3/1998 | Tabata et al. | ............. | 345/7 |
| 5,808,589 | A | * | 9/1998 | Fergason | ............. | 345/8 |
| 5,963,247 | A | * | 10/1999 | Banitt | ............. | 348/121 |
| 6,140,980 | A | * | 10/2000 | Spitzer et al. | ............. | 345/8 |
| 6,252,989 | B1 | * | 6/2001 | Geisler et al. | ............. | 382/232 |

(Continued)

FOREIGN PATENT DOCUMENTS

JP    2002-148711    5/2002

(Continued)

OTHER PUBLICATIONS

N. Shibano, P.V. Hareesh, H. Hoshino, R. Kawamura, A. Yamamoto, M. Kashiwagi, K. Sawada, "CyberDome: PC Clustered Hemi Spherical Immersive Projection Display," Proc. of ICAT2003, 2003.*

(Continued)

*Primary Examiner*—Amare Mengistu
*Assistant Examiner*—Dmitriy Bolotin
(74) *Attorney, Agent, or Firm*—Finnegan, Henderson, Farabow, Garrett & Dunner, L.L.P.

(57) ABSTRACT

An image display unit has a display region with a higher resolution than a number of pixels of an image. A base information storage unit stores viewing position information of a viewer and size information of the display region. A wide-angle transformation unit calculates a central area including a viewing center of the viewer of the display region using the viewing position information and the size information, divides the image into a first pixel area corresponding to the central area and a second pixel area corresponding to a peripheral area other than the central area, and transforms the first pixel area and the second pixel area by magnifying. A magnification ratio of the first pixel area is less than a magnification ratio of the second pixel area. The image display unit displays an image including the transformed first pixel area and the transformed second pixel area.

20 Claims, 15 Drawing Sheets

U.S. PATENT DOCUMENTS

| | | | |
|---|---|---|---|
| 6,339,434 B1 * | 1/2002 | West et al. | 345/667 |
| 6,417,861 B1 * | 7/2002 | Deering et al. | 345/589 |
| 6,417,867 B1 * | 7/2002 | Hallberg | 345/660 |
| 6,654,019 B2 * | 11/2003 | Gilbert et al. | 345/474 |
| 6,781,606 B2 * | 8/2004 | Jouppi | 345/698 |
| 6,890,077 B2 * | 5/2005 | Dunn | 351/224 |
| 6,919,907 B2 * | 7/2005 | Berstis | 345/619 |
| 6,975,335 B2 * | 12/2005 | Watanabe | 345/660 |
| 7,081,870 B2 * | 7/2006 | Bronson | 345/7 |
| 7,090,358 B2 * | 8/2006 | Feigel et al. | 353/94 |
| 7,470,027 B2 * | 12/2008 | Hillis et al. | 351/247 |
| 7,475,356 B2 * | 1/2009 | Baudisch et al. | 715/761 |
| 7,495,638 B2 * | 2/2009 | Lamvik et al. | 345/76 |
| 7,629,945 B2 * | 12/2009 | Baudisch | 345/1.3 |
| 2002/0064314 A1 * | 5/2002 | Comaniciu et al. | 382/239 |
| 2002/0167461 A1 * | 11/2002 | Bronson | 345/7 |
| 2007/0188603 A1 * | 8/2007 | Riederer et al. | 348/54 |
| 2007/0229557 A1 * | 10/2007 | Okumura et al. | 345/698 |
| 2009/0003795 A1 * | 1/2009 | Yashima | 386/52 |
| 2009/0160872 A1 * | 6/2009 | Gibbons | 345/619 |

FOREIGN PATENT DOCUMENTS

| | | | |
|---|---|---|---|
| JP | 2008233765 A | * | 10/2008 |
| JP | 2008242048 A | * | 10/2008 |

OTHER PUBLICATIONS

Kazuyo Iwamoto, Kiyoshi Komoriya, Kazuo Tanie, "Eye Movement Tracking Type Image Display System for Wide View Image Presentation with High-resolution—Evaluation of High-resolution Image Presentation", Proceedings of the 2002 IEEE/RSJ International Conference on Intelligent Robots and Systems (IROS2002 EPFL, Switzerland), pp. 1190-1195, Oct. 3, 2002.*

Philip Kortum and Wilson S. Geisler. "Implementation of a foveated image coding system for image bandwidth reduction". In Human Vision and Electronic Imaging, SPIE Proceedings vol. 2657, pp. 350-360, 1996.*

T. Sasaki, A. Hotta and H. Okumura, "Development of Hyper-realistic Peripheral-visual-field Image Processing Using Distortion Perception Limit of Peripheral Vision", IDW'06, pp. 1901-1904 (2006).*

Nagumo; "A Study of an Electric Power Plant Training Environment Using a Small Cylindrical Screen"; The Virtual Reality Society of Japan, vol. 4, No. 3, pp. 521-529, (1999).

* cited by examiner

IMAGE DISPLAY APPARATUS AND METHOD

CROSS-REFERENCE TO RELATED APPLICATIONS

This application is based upon and claims the benefit of priority from prior Japanese Patent Application No. 2006-091694, filed on Mar. 29, 2006; the entire contents of which are incorporated herein by reference.

FIELD OF THE INVENTION

The present invention relates to an apparatus and a method for displaying an image with a wide field of view.

BACKGROUND OF THE INVENTION

In order for a viewer to feel hyper-reality, a field of view above at least 30° is necessary, and an image display apparatus having a large field of view is necessary. Such kind image displays are disclosed in the following references.

(A) Japanese Patent Publication No. 2002-148711

(B) Toshiki Nagumo, "A Study of an Electric Power Plant Training Environment Using a Small Cylindrical Screen", The Virtual Reality Society of Japan, Vol. 4, No. 3, pp 521-529 (1999)

In these references, an image is projected onto a screen having a spherical surface. By viewing from a concave side of the screen, the image can be displayed by wide field of view on the screen. In this case, in order for a viewer not to view aliasing (distortion) on the image projected onto the screen, the image is processed by aliasing-compensation before projection (Especially, in the reference (A)). However, in order to reduce the aliasing and maintain resolution of the image, for example, a plurality of projectors is necessary. In this case, the image display apparatus is complicated and the cost increases.

SUMMARY OF THE INVENTION

The present invention is directed to an apparatus and a method for easily displaying an image with a wide field of view and hyper-reality.

According to an aspect of the present invention, there is provided an apparatus for displaying an image, comprising: an image display unit including a display region having a higher resolution than a number of pixels of the image; a base information storage unit configured to store viewing position information of a viewer, and size information of the display region; and a wide-angle transformation unit configured to calculate a central area including a viewing center of the viewer of the display region using the viewing position information and the size information, to divide the image into a first pixel area corresponding to the central area and a second pixel area corresponding to a peripheral area other than the central area, and to transform the first pixel area and the second pixel area by magnifying, a magnification ratio of the first pixel area being less than a magnification ratio of the second pixel area; wherein the image display unit displays an image including the transformed first pixel area and the transformed second pixel area.

According to another aspect of the present invention, there is also provided a method for displaying an image on a display region having a higher resolution than a number of pixels of the image, comprising: storing viewing position information of a viewer, and size information of the display region; calculating a central area including a viewing center of the viewer of the display region using the viewing position information and the size information; dividing the image into a first pixel area corresponding to the central area and a second pixel area corresponding to a peripheral area other than the central area; transforming the first pixel area and the second pixel area by magnifying, a magnification ratio of the first pixel area being less than a magnification ratio of the second pixel area; and displaying an image including the transformed first pixel area and the transformed second pixel area.

According to still another aspect of the present invention, there is also provided a computer readable medium that stores a computer program for causing a computer to display an image on a display region having a higher resolution than a number of pixels of the image, the computer program comprising: a first program code to store viewing position information of a viewer, and size information of the display region; a second program code to calculate a central area including a viewing center of the viewer of the display region using the viewing position information and the size information; a third program code to divide the image into a first pixel area corresponding to the central area and a second pixel area corresponding to a peripheral area other than the central area; a fourth program code to transform the first pixel area and the second pixel area by magnifying, a magnification ratio of the first pixel area being less than a magnification ratio of the second pixel area; and a fifth program code to display an image including the transformed first pixel area and the transformed second pixel area.

DETAILED DESCRIPTION OF THE EMBODIMENTS

Figure 1:
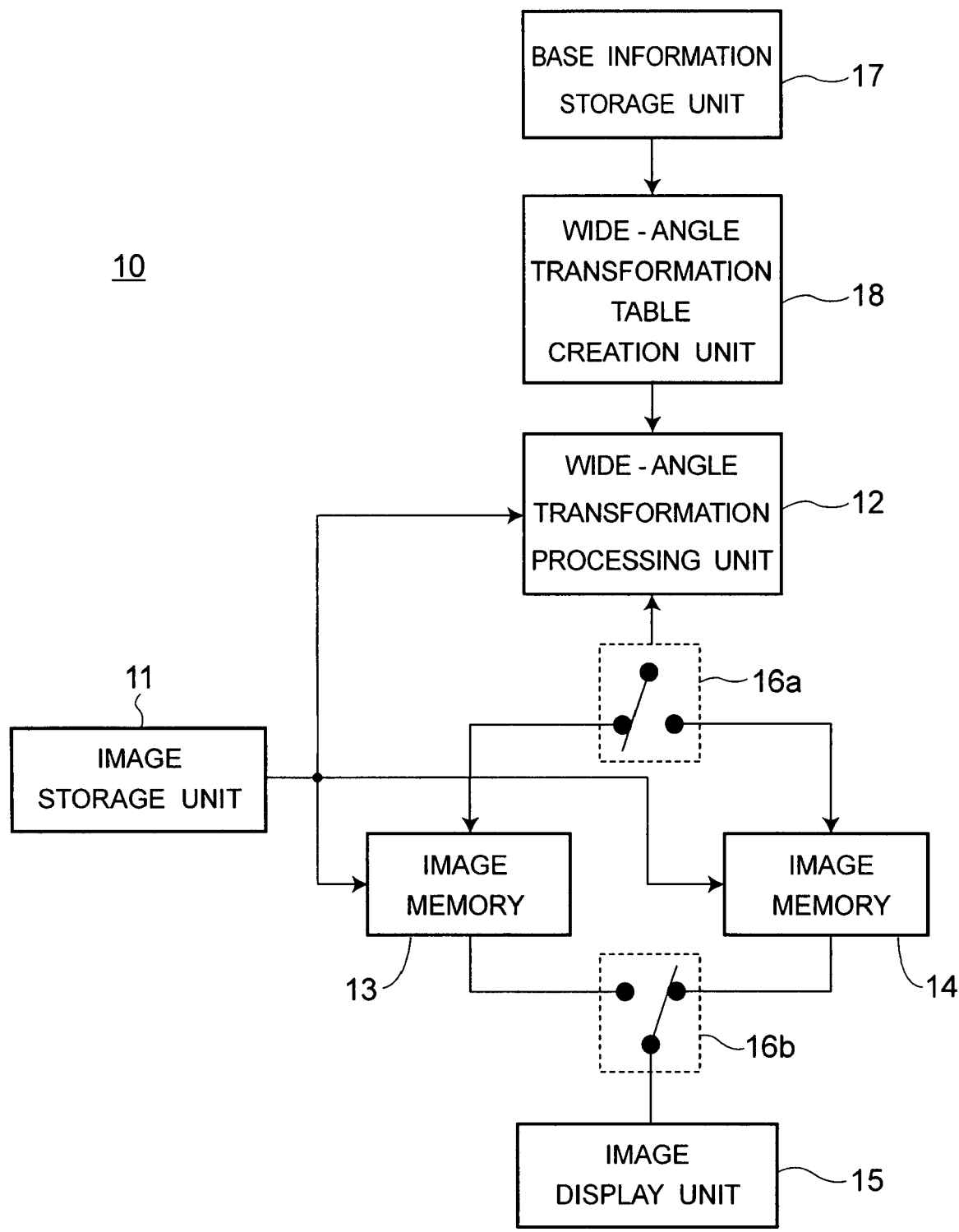
FIG. 1 is a block diagram of the image display apparatus according to a first embodiment.

Hereinafter, various embodiments of the present invention will be explained by referring to the drawings. The present invention is not limited to the following embodiments.

First Embodiment

FIG. 1 is a block diagram of an image display apparatus 10 according to the first embodiment of the present invention. The image display apparatus 10 includes an image storage unit 11, a wide angle transformation processing unit 12, image memories 13 and 14, an image display unit 15, change-over switches 16a and 16b, a base information storage unit 17, and a wide angle transformation table creation unit 18.

The image storage unit 11 is, for example, a memory apparatus such as a hard disk drive or a semiconductor memory, which stores and outputs image information (including both still picture and motion picture). The wide-angle transformation processing unit 12 preserves a wide-angle transformation table, and performs wide-angle transformation of an image (output from the image storage unit 11) using the wide-angle transformation table. By rewriting contents of the image memories 13 and 14 by the wide-angle transformation processing unit 12, the wide-angle transformation is executed.

In the wide-angle transformation table, as shown in the following expression (1), a position $(x_0, y_0)$ of a pixel $Y_{in}[x_0, y_0]$ (before transformation), and a position $(x_1, y_1)$ of a pixel $Y_{out}[x_1, y_1]$ (after transformation), are correspondingly represented.

$$Y_{out}[x_1, y_1] = Y_{in}[F_x(x_0), F_y(y_0)] \quad (1)$$

By changing a position of each pixel forming an image in the image memory 13 or 14 based on the expression (1), the wide-angle transformation processing unit 12 executes wide-angle transformation of the image. The wide-angle transformation unit 12 reads each pixel of the image from the image memory 13 or 14, and updately writes each pixel of the image to the image memory 13 or 14. In this case, by controlling addresses to read pixels and addresses to write pixels, wide-angle transformation is executed. Because each address on the image memory 13 or 14 corresponds to each position of pixels of the image. In this way, wide angle transformation is a kind of address change executed at high speed (For example, in real-time).

The correspondence relationship between a pixel of pre-transformation and a transformed pixel is not always one to one. In case of magnifying (enlarging) the image, an original pixel (before transformation) can correspond to a plurality of transformed pixels. If correspondence between an original pixel and the transformed pixel is one to one, pixels not corresponding to the original pixel exist among transformed pixels. Briefly, transformed pixels are aligned as dot shape on a display region, which is undesirable to view.

In case of reducing the image, a plurality of original pixels can correspond to one transformed pixel. In proportion to reduction of the image, a number of transformed pixels often decrease in comparison with a number of original pixels because of resolution of the display region. In this case, decrease of the number of transformed pixels means fall of resolution of the image, which is undesirable. As explained afterwards, by sufficiently enlarging density (resolution) of pixels displayable on the display region, fall of the resolution is prevented.

The image memories 13 and 14 store the image and may be, for example, a semiconductor memory. An image stored in the image memory 13 or 14 is displayed on the image display unit 15. By rewriting contents of the image memories 13 and 14 by the wide-angle transformation processing unit 12, wide-angle transformation of the image is executed. The image memories 13 and 14 are alternatively accessed through the change-over switches 16a and 16b to be used for wide-angle transformation and for display. Accordingly, a present frame image and a previous frame image are alternatively input to the image memory 13 and 14.

The image display unit 15 has a display region Ad to display a wide-angle transformed image stored in the image memory 13 or 14. As explained afterwards, a central part of the image is displayed with reduction, because the resolution of the central part on the display region Ad falls if all parts of the image are equally magnified. Briefly, by limiting the resolution on the display region Ad, it often happens that reduced image cannot be displayed clearly. In the first embodiment, by raising the resolution of the central part relative to the resolution of a peripheral part on the display region Ad, reduced image of the central part can be displayed clearly.

However, as to a hardware of the display region Ad of the image display unit 15, it has no objection that resolution of the central part is equal to resolution of the peripheral part. For example, if an image output from the image storage unit 11 is NTSC image and resolution of the display region of the image display unit 15 is based on HDTV, resolution of the display region Ad is double (higher) of resolution of the image along a horizontal direction and a vertical direction. Accordingly, even if the central part is relatively reduced as ½ (density of pixels is double), pixels of double density can be displayed on the display region Ad. In this way, if resolution of the display region Ad is higher than resolution of the image, by reducing a size of the central part of the display region Ad, resolution of the central part can be relatively raised.

The change-over switches 16a and 16b alternate the image memory 13 and 14 to be used for wide-angle transformation and for display. The change-over switch 16a selects one of the image memories 13 and 14 for wide-angle transformation. One of the image memories 13 and 14 connected to the wide-angle transformation processing unit 12 by the change-over switch 16a is an object of wide-angle transformation. The other of the image memories 13 and 14 is connected to the image display unit 15 by the change-over switch 16b and is an object of image display. By completion of wide-angle transformation, the change-over switches 16a and 16b cooperatively operate. Briefly, when wide-angle transformation is completed for one of the image memories 13 and 14, by operating the change-over switches 16a and 16b, the image memories 13 and 14 are changed for wide-angle transformation and for display.

The base information storage unit 17 stores base information of wide-angle transformation such as position information of a viewer, a size and resolution of the display region Ad. The wide-angle transformation table creation unit 18 creates a wide-angle transformation table used by the wide-angle transformation processing unit 12. This processing is explained afterwards.

(Operation of the Image Display Apparatus 10)

Summary of operation of the image display apparatus 10 is explained. Image data output from the image storage unit 11 is input to the wide-angle transformation processing unit 12 and the image memory 13 or 14. The latest image data (present frame) is stored in one of the image memories 13 and 14, and image data of the previous frame is stored in the other of the image memories 13 and 14. The wide-angle transformation processing unit 12 executes wide-angle transformation of the latest image data stored in one of the image memories 13 and 14. Image data of the previous frame stored in the other of the image memories 13 and 14 is already transformed into wide-angle and displayed on the image display unit 15. When wide-angle transformation is completed for one of the image memories 13 and 14, wide-angle transformation and display for the image memories 13 and 14 are changed by the change-over switches 16a and 16b. This change-over corresponds to the output of a new image (next frame) from the image storage unit 11. Briefly, by cooperating update of frame image with change of wide-angle transformation/display, wide-angle transformation and display of the image are continuously executed.

Figure 2:
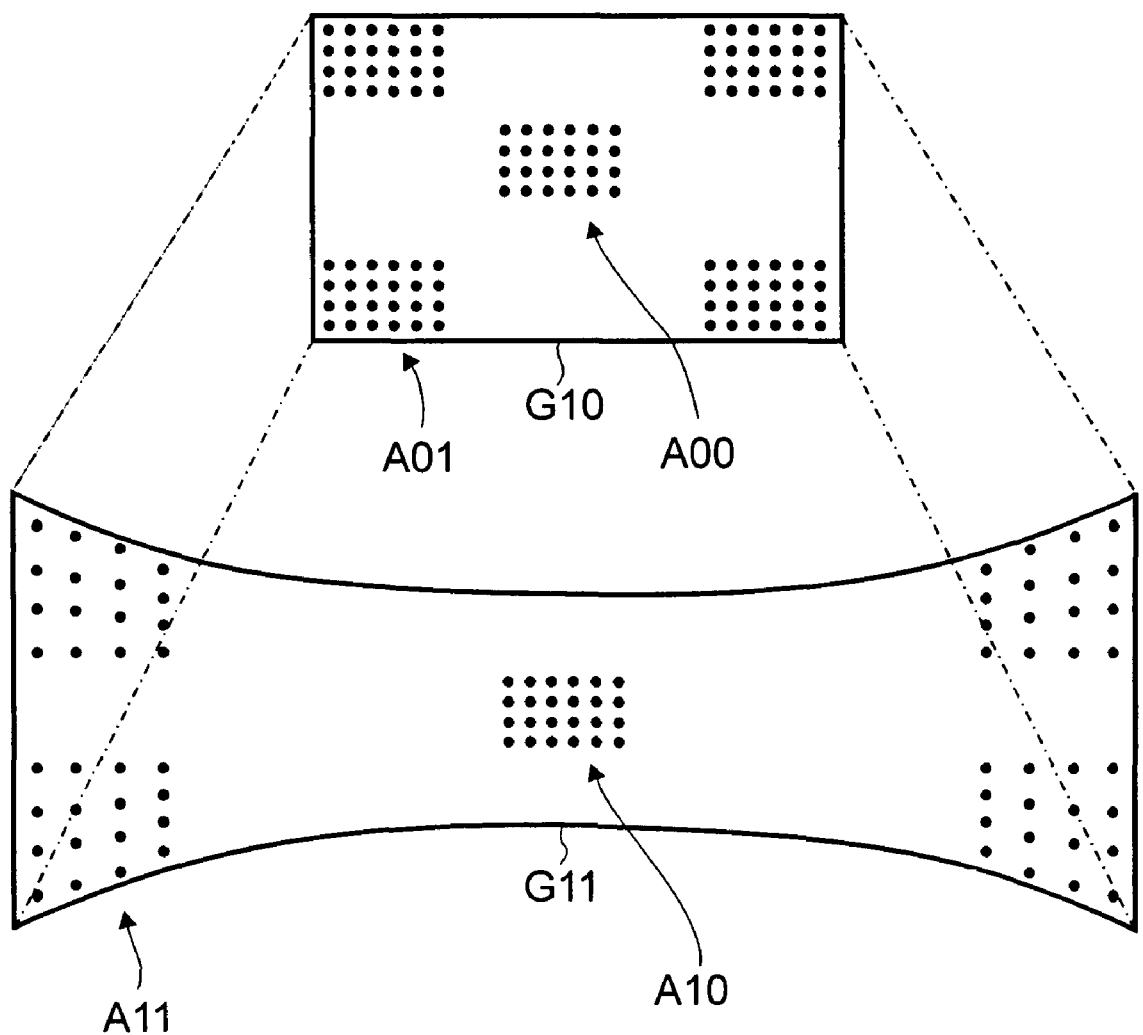
FIG. 2 is a schematic diagram of an original image and a wide-angle transformed image.
Figure 3:
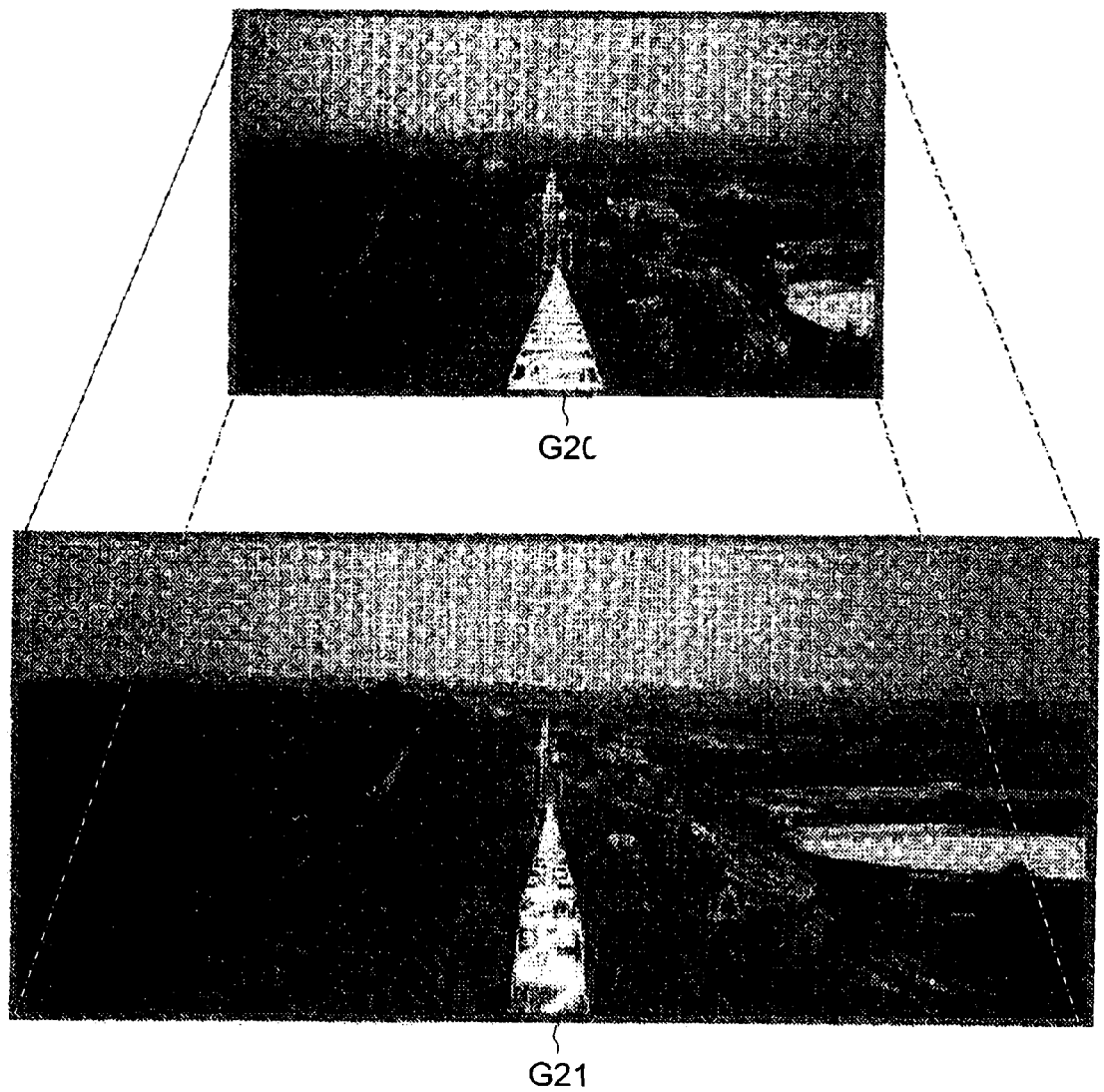
FIG. 3 shows an original image and a wide-angle transformed image.

FIG. 2 is a schematic diagram of the correspondence between the original image G10 (before transformation) and the wide-angle transformed image G11 by the wide-angle transformation processing unit 12. FIG. 3 shows an example of correspondence between the original image G20 (before transformation) and the wide-angle transformed image G21 by the wide-angle transformation processing unit 12. By comparing the original images G10 and G20 with the wide-angle transformed images G11 and G21, the original image is magnified as a whole. The reason of this magnification is that hyper-reality is raised by enlarging a viewer's field of view θ. For example, by viewing NTSC image or HD image from a position nearer than the most suitable viewing distance, a field of view can be enlarged. In case of an NTSC image, the most suitable viewing distance is seven times the vertical length of the image. In case of an HD image, the most suitable viewing distance is three times the vertical length of the image.

A magnification ratio of each part of the image is different. The magnification ratio is low (For example, not greater than "1") for central parts A00 and A10 of the image, and the magnification ratio is high (For example, greater than "1") for peripheral parts A01 and A11 of the image. Briefly, resolution of the central part on the image is high (the central part is reduced or the same size as the original part). On the other hand, resolution of the peripheral part of the image is low (the peripheral part is magnified). As to magnification of the peripheral part, a new pixel is interpolated between neighboring magnified pixels and each position is shifted from neighboring original pixels. For example, a new pixel value is calculated by taking a weighting sum of pixel values of four pixels adjacent to a new pixel position, and the new pixel value is assigned to the new pixel position.

The reason that magnification ratio of each part on the image is different is explained. Resolution of human's viewing (detection limit of distortion) is higher in a central field of view and lower in a peripheral field of view. By using this characteristic, hyper-reality can be raised by simple image processing. Briefly, by concentrating display information in human's viewing important part (central field of view), i.e., by preserving high resolution (information density of the central part), high hyper-reality and effective information use can be consistent. In FIGS. 2 and 3, difference of outline shape of images G11 and G12 is not essential. In the image G21, top and bottom parts of the image are cut in correspondence with shape of the display region Ad.

(Detail of Wide-Angle Transformation Processing)

Figure 4:
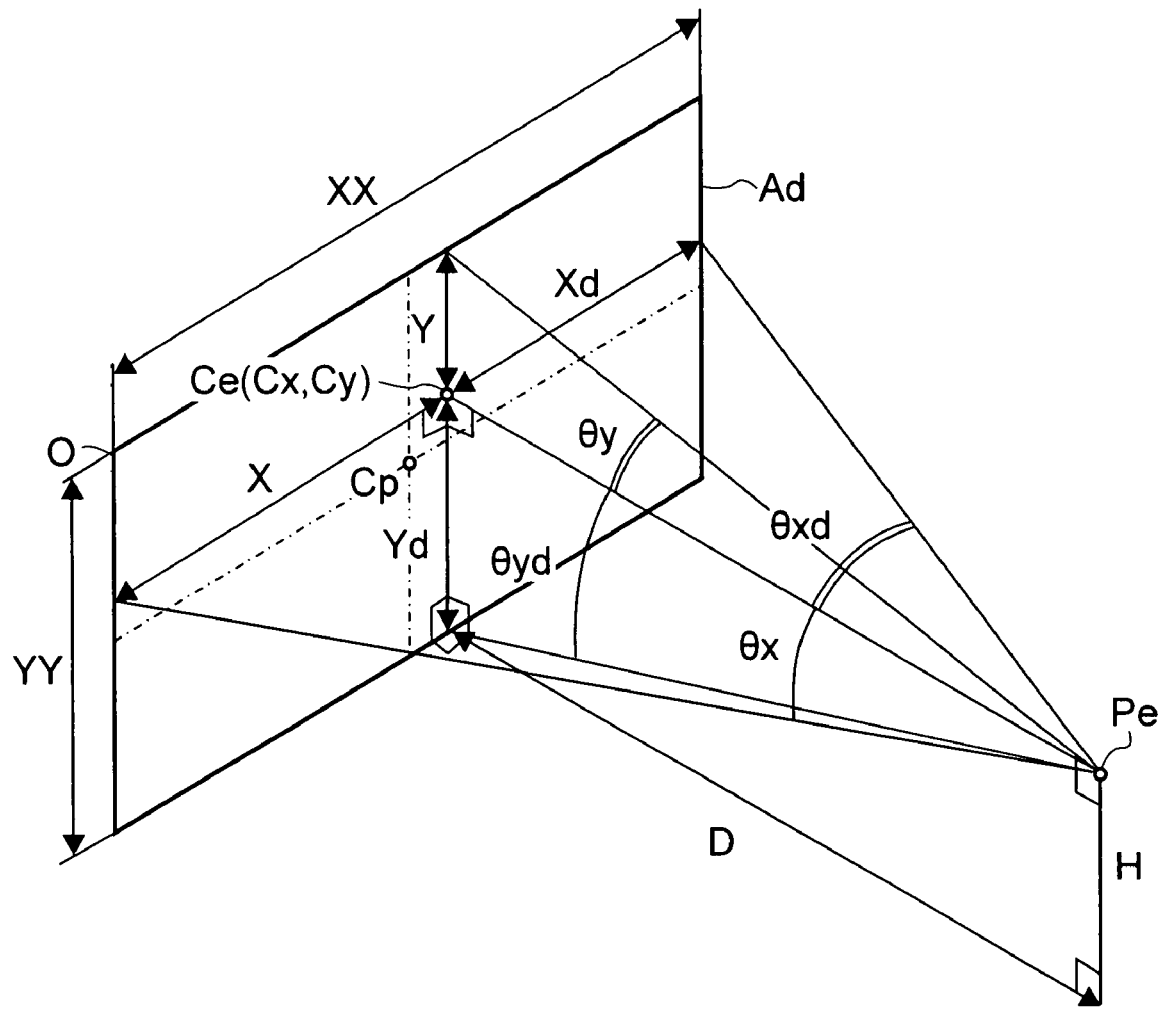
FIG. 4 is a schematic diagram of relationship between a viewing point of a viewer and a display region of the image display unit.

Hereinafter, detail processing of the wide-angle transformation is explained. FIG. 4 is a schematic diagram of the relationship between a display region Ad of the image display unit 15 and a viewing point Pe of a viewer. The image display unit 15 includes the display region Ad. The viewing point Pe of the viewer is positioned between both eyes of the viewer as a base point of the viewer's field of view. As shown in FIG. 4, the viewing point is located at a distance D and a height H from the display region Ad. A left upper corner of the display region Ad is the origin O.

The display region Ad is a plain region (horizontal size XX, vertical size YY) of rectangle shape of relatively large area, which includes a physical center Cp and a viewing center Ce. The physical center Cp is a center of the display region Ad. The viewing center Ce corresponds to the viewing point Pe, which is a center of field of view of the viewer.

As shown in FIG. 4, a distance (length) between the viewing center Ce and four sides (right and left, top and bottom) of the display region Ad is respectively X, Xd, Y, and Yd. Furthermore, a field of view of each of right and left, top and bottom of the viewer (one side field of view) is respectively Θx, Θxd, Θy, and Θyd. Furthermore, a horizontal field of view is "Θxx=Θx+Θxd", and a vertical field of view is "Θyy=Θy+Θyd". In this case, by setting a distance D between the viewer and the display region Ad shorter than the most suitable distance, the viewer's one side field of view θ intentionally becomes greater than 30°, and hyper-reality raises.

Figure 5:
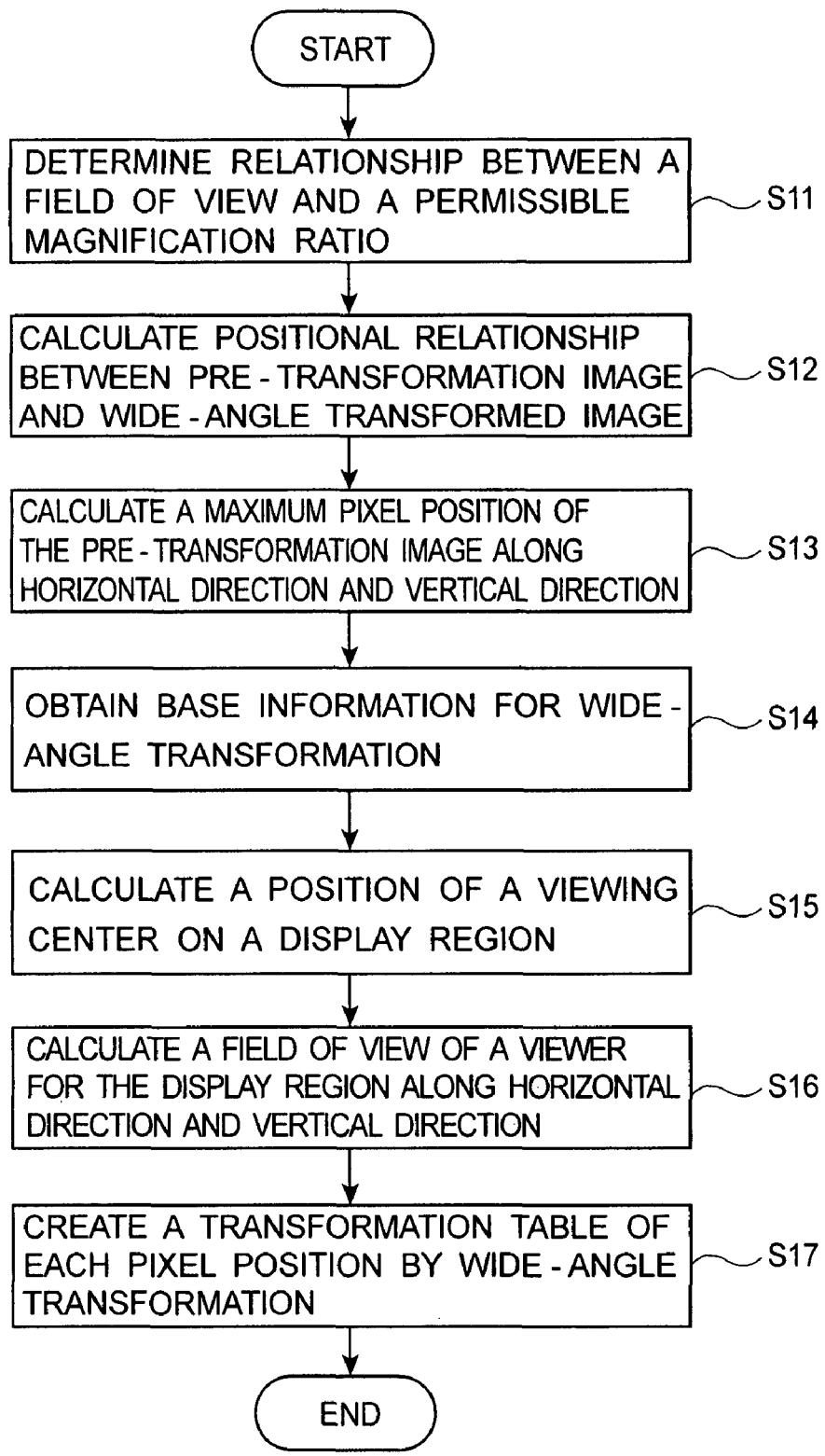
FIG. 5 is a flow chart of creation processing of a wide-angle transformation table.

FIG. 5 is a flow chart of creation processing of a wide-angle transformation table.

(1) Determination of Relationship Between a Display Position (Before Transformation) and a Permissible Magnification Ratio (S11)

Figure 6:
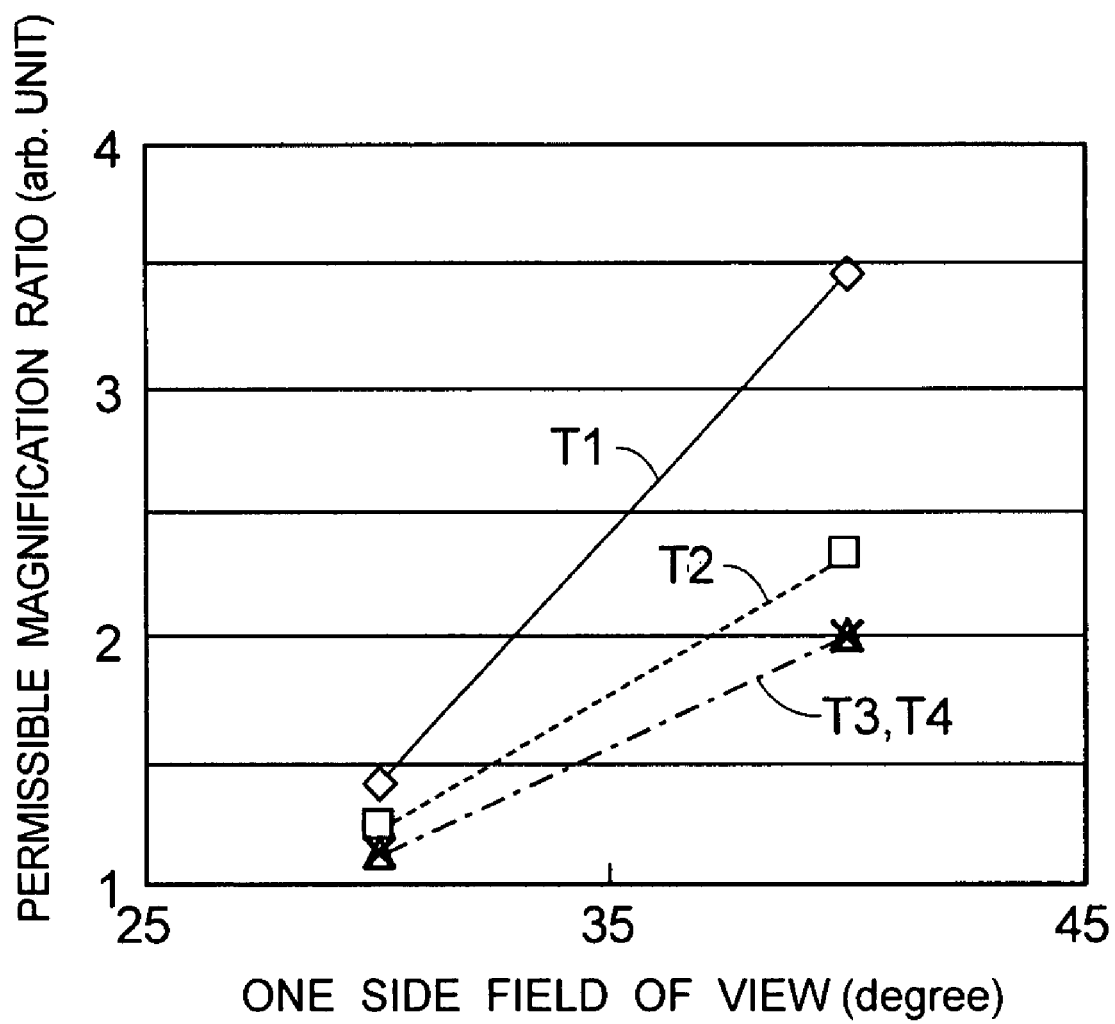
FIG. 6 is a graph representing a relationship between one side field of view and a permissible ratio.

FIG. 6 is a graph representing an evaluated and numericalized relationship between one side field of view and permissible magnification ratios. The permissible magnification ratio is a limit of magnification ratio of the image to which the viewer gives no heed. Briefly, the graph is a permissible straight line representing a limit of magnifying ratio (detection limit of wide-angle distortion) for one side field of view. If the permissible magnification ratio is under the straight line in FIG. 6, the viewer gives no heed to distortion by magnification. Graph T1 and T2 respectively represent a permissible curved line along top and bottom direction (vertical direction), and graph T3 and T4 respectively represents a permissible curved line along right and left direction (horizontal direction). If one side field of view is below 30°, magnification ratio "1.1" along horizontal direction, and magnification ratio "1.4" along vertical direction (especially, top direction), are permissible. If one side field of view is above 30°, the permissible magnification ratio greatly increases.

In this way, a plurality of permissible curved lines T1-T4 is prepared, and a magnification ratio E(l) can be suitably selected. In the first embodiment, permissible lines (T3, T4) of a horizontal direction are applicable to a vertical direction. A permissible limit of the horizontal direction is less than a permissible limit of the vertical direction. Accordingly, the permissible limit of the horizontal direction can be commonly used as the vertical direction. Contrary to this, a permissible curved line may be differently used as the vertical direction and the horizontal direction.

As to a distance 1 (from the viewing center) on the display region Ad, an approximate curved line of magnification ratio E(l) is represented by the following expression (2).

$$E(l) = 1 \quad\quad (l \leq Th) \quad\quad\quad (2)$$
$$= \exp(\alpha * (1 - Th)) \quad (l > Th)$$
$$(\alpha = 1.8368)$$

The expression (2) is calculated by approximating measurement result of subjects using the method of least squares.

"Th" has dimension of length and its magnification ratio is constant. Briefly, "Th" represents an area (central part) from the viewing center on the display region. As shown in FIG. 6, the distortion on the image is not recognized by the viewer within one side field of view "30°". Accordingly, "Th" is represented by the following expression (3).

$$Th = D*\tan(\Theta th) = D*\tan(30°) \quad\quad (3)$$

(2) Calculation of Display Position After Transformation (S12)

As mentioned-above, magnification of the image is different for a central part and a peripheral part. A transformed position $l_{act}$ (after wide-angle transformation) is calculated by integrating E(l) by 1 from "0" to an original position $l_t$ (before transformation).

$$l_{act}(l_t) = \int E(l)dl \qquad (2)$$
$$= l \qquad (l \leq Th)$$
$$= Th + *(\exp(\alpha*(l-Th))-1)/\alpha \quad (l > Th)$$

This expression (4) represents positional relationship of an original pixel on the image and a transformed pixel on the display region Ad.

(3) Calculation of Maximum Pixel Position Along Horizontal Direction and Vertical Direction (Before Transformation) (S13)

Maximum pixel position "mppnx" and "mppnxd" along horizontal direction (before transformation) is represented by the following expression (5).

$$mppnx=Th+(\ln(\alpha*(x-Th)+1))/\alpha$$
$$mppnxd=Th+(\ln(\alpha*(xd-Th)+1))/\alpha \qquad (5)$$

Maximum pixel position "mppny" and "mppnyd" along vertical direction (before transformation) is represented by the following expression (6).

$$mppny=Th+(\ln(\alpha*(y-Th)+1))/\alpha$$
$$mppnyd=Th+(\ln(\alpha*(yd-Th)+1))/\alpha \qquad (6)$$

Processing of steps S11~S13 need not be repeatedly executed. Calculation result of the expressions (5) and (6) may be preserved.

(4) Acquisition of Base Information for Wide-Angle Transformation (S14)

Base information for wide-angle transformation is obtained. The base information is as follows.

distance D between the display region Ad and a viewer

The distance D can be input from an input apparatus such as a keyboard. Furthermore, the distance D may be detected by a detector. In this case, the distance D can be detected by time from radiation timing of ultrasonic or infrared ray to returning timing of the ultrasonic or infrared ray reflected by the viewer.

horizontal size XX and vertical size YY of the display region Ad a number of pixels cxAVI along horizontal direction, a number of pixels cyAVL along vertical direction ratio (horizontal division ratio) RX that the viewing center Ce divides the image along the horizontal direction, ratio (vertical division ratio) RY that the viewing center Ce divides the image along the vertical direction (5) Calculation of a Position (Cx,Cy) of the Viewing Center Ce (S15)

A position of the viewing center Ce is calculated. The position (Cx,Cy) is represented as the number of pixels based on the origin O, and calculated by following expression (7).

$$CX=cxAVI*RX$$
$$CY=cyAVI*RY \qquad (7)$$

Briefly, the position (Cx,Cy) is calculated by the number of pixels cxAVI along horizontal direction, the number of pixels cyAVI along vertical direction, the horizontal division ratio RX, and the vertical division ratio RY.

(6) Calculation of One Side Field of View (S16)

In general, the viewing center Ce does not coincide with the physical center Cp. Accordingly, a condition of wide-angle transformation is different for top and bottom and right and left of the image. One side field of view $\Theta x$, $\Theta xd$, $\Theta y$, and $\Theta yd$ is respectively calculated by following expression (8) using length X, Xd, Y, and Yd.

$$\Theta x = \tan^{-1}(X/D)$$
$$\Theta xd = \tan^{-1}(Xd/D)$$
$$\Theta y = \tan^{-1}(Y/D)$$
$$\Theta yd = \tan^{-1}(Yd/D) \qquad (8)$$

(7) Calculation of Correspondence Relationship Between an Original Pixel on the Image and a Transformed Pixel on the Display Region (S17)

Correspondence relationship between an original pixel and a transformed pixel is calculated. Briefly, a transformation table of pixels along horizontal direction and vertical direction is created. Assume that a maximum pixel number of the display region Ad along horizontal direction is $n_{xmax}$ (in case of full HD, $n_{xmax}$ is "1920"). As to a pixel number $n_x$ along the horizontal direction, transformation tables $Fx[n_x]$ and $Fxd[n_x]$ are represented by the following expressions (9) and (10).

$$Fx[n_x] = n_x * x/mppnx \ (n_x \leq cxAVI*RX*Th/x) \qquad (9)$$
$$= n_{xmax}*RX*(Th+(\ln(\alpha*(n_x/(cxAVI*RX)*$$
$$x-Th)+1))/\alpha)/mppnx$$
$$(n_x > cxAVI*RX*Th/x)$$

$$Fxd[n_x] = n_x*xd/mppnxd \ (n_x \leq cxAVI*(1-RX)*Th/xd) \qquad (10)$$
$$= n_{xmax}*(1-RX)*(Th+(\ln(\alpha*(n_x/(cxAVI*$$
$$(1-RX)*xd-Th)+1))/\alpha)mppnxd$$
$$(n_x > cxAVI*(1-RX)*Th/xd)$$

The number of original pixels on the image is constant for transformation. However, original pixel positions on a peripheral part of the image are magnified, and "$n_{xmax}$>mppnx" is concluded. Relatively, original pixel positions of a central part on the image are reduced. The nearer a viewer comes to a surface of the display region, the larger the field of view relatively is. Accordingly, reduction display of the central part relatively functions to maintain a size of the display region within the viewer's field of view.

Assume that a maximum pixel number of the display region Ad along vertical direction is $n_{ymax}$ (in case of full HD, $n_{ymax}$ is "1080"). As to a pixel number $n_y$ along vertical direction, transformation tables $Fy[n_y]$ and $Fyd[n_y]$ are represented by the following expressions (11) and (12).

$$Fy[n_y] = n_y*y/mppny \ (n_y \leq cyAVI*RY*Th/y) \qquad (11)$$
$$= n_{ymax}*RY*(Th+(\ln(\alpha*(n_y/(cyAVI*RY)*$$
$$y-Th)+1))/\alpha)/mppny$$
$$(n_y > cyAVI*RY*Th/y)$$

-continued $$Fyd[n_y] = n_y * yd/mppnyd \ (n_y \leq cyAVI*(1-RY)*Th/yd) \quad (12)$$
$$= n_{ymax} * (1-RY) * (Th + (\ln(\alpha * (n_y/(cyAVI *$$
$$(1-RY)*yd - Th) + 1))/\alpha)/mppnyd$$
$$(n_y > cyAVI*(1-RY)*Th/yd)$$

Based on this transformation table, by converting an input image Yin[x,y] using the following expression (13), an output image Yout[x,y] is generated. The expression (13) corresponds to the above-mentioned expression (1). A pixel position [x,y] is represented as a number of pixels from the origin O along the horizontal direction and the vertical direction.

$$Yout[x, y] = Yin[Fx(x), Fy(y)] \ (x < Cx, y < Cy) \quad (13)$$
$$= Yin[Fx(x), Fyd(y)] \ (x < Cx, y \geq Cy)$$
$$= Yin[Fxd(x), Fy(y)] \ (x \geq Cx, y < Cy)$$
$$= Yin[Fxd(x), Fyd(y)] \ (x \geq Cx, y \geq Cy)$$

As mentioned-above, in the first embodiment, by using fall of detection limit of distortion at a peripheral field of view, even if a number of pixels of an original image is few (for example, resolution of the image is below HDTV level), information of the original image can be transformed for a wide field of view. Briefly, by concentrating the information of the original image on a central part of the display region, the image can be displayed with hyper-reality.

In the first embodiment, a magnification ratio of the central part is less than a magnification ratio of the peripheral part on the original image. Accordingly, even if a viewer comes near or goes away from the display region, motion and size of the central part on the display region are constantly maintained, and fatigue of a viewer reduces. If the central part and the peripheral part are magnified by the same magnification ratio and displayed, size and motion of the central part are relatively larger than the peripheral part. In this case, the viewer is apt to be tired.

Second Embodiment

Figure 7:
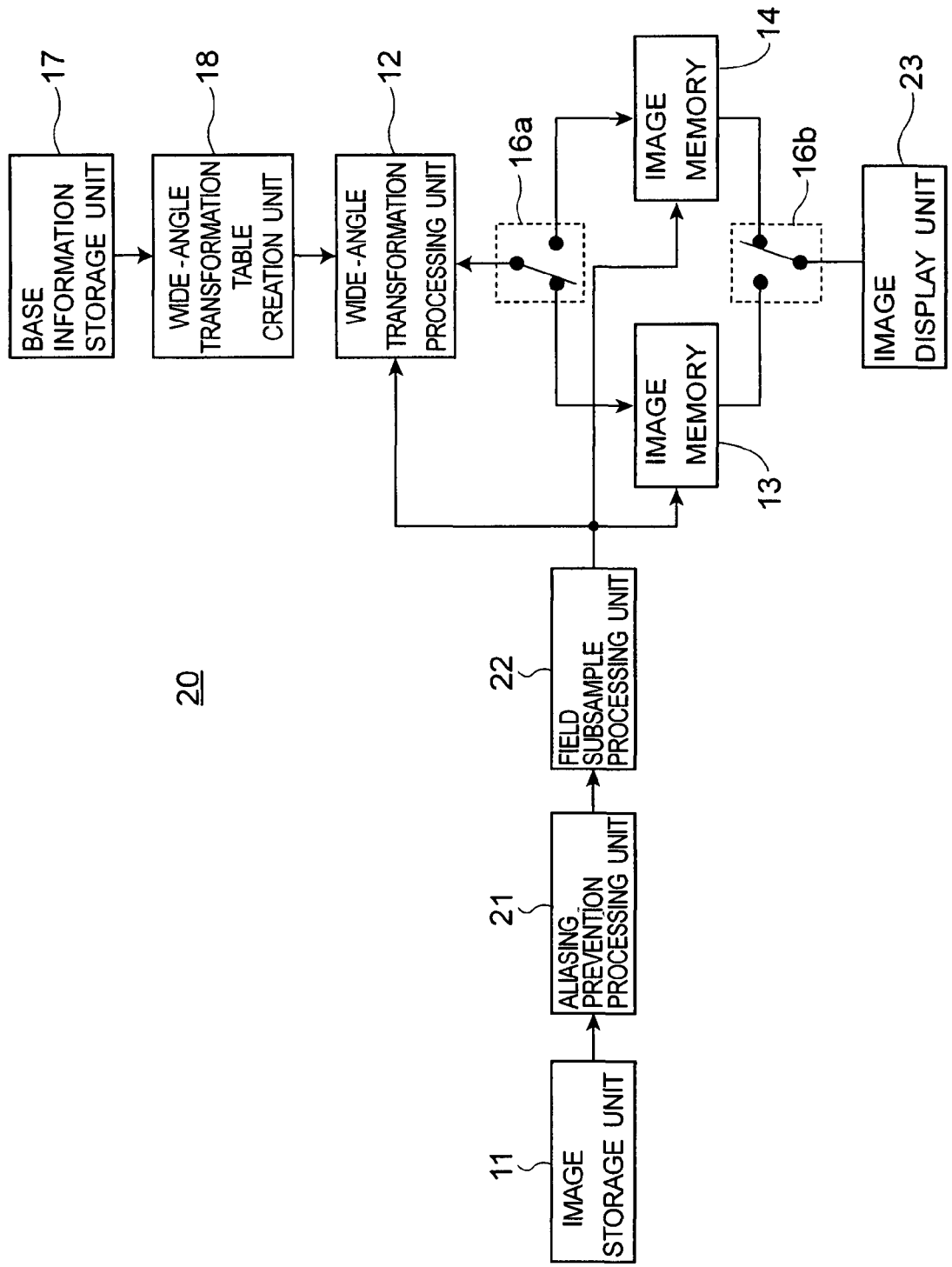
FIG. 7 is a block diagram of the image display apparatus according to the second embodiment of the present invention.

FIG. 7 is a block diagram of an image display apparatus 20 according to the second embodiment. The image display apparatus 20 includes the image storage unit 11, an aliasing prevention processing unit 21, a field subsample processing unit 22, the wide-angle transformation processing unit 12, the image memories 13 and 14, an image display unit 23, changeover switches 16a and 16b, the base information storage unit 17, and the wide-angle transformation table creation unit 18.

Figure 8:
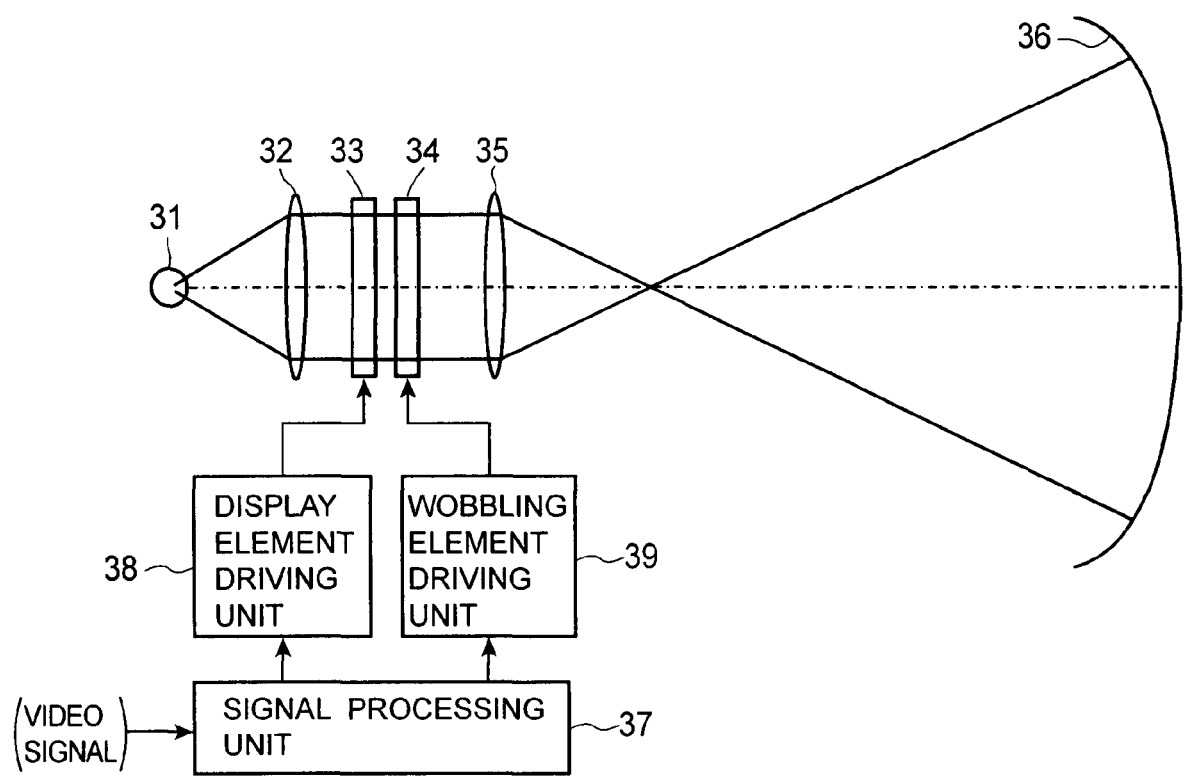
FIG. 8 is a block diagram of an image display unit in FIG. 7.

FIG. 8 is a block diagram of the image display unit 23 in FIG. 7. The image display unit 23 is a display apparatus of projection type, and includes a source of light 31, a collimator lens 32, a display element 33, a wobbling element 34, a projection lens 35, a screen 36, a signal processing unit 37, a display element driving unit 38, and a wobbling element driving unit 39.

As to the source of light 31, for example, a source of light of high brightness such as a metal halide lamp is preferably used. The collimetor lens 32 transforms light radiated from the source of light 31 into parallel light. As to the display element 33, for example, a display element of transparent type such as a liquid crystal display device is preferably used.

The wobbling element 34 is an optical element to periodically shift (wobble) an optical path of light radiated from the display element 33. The optical path can be shifted by, for example, movement (vibration) of the optical element such as a prism. Furthermore, electrical control such as polarization or birefringence ratio may be used.

For example, the wobbling element 34 repeatedly shifts the optical path by a shift quantity "0" and a shift quantity "½ pixel" at an interval "1/60 second" (field interval Δtf). By shifting the optical path, a projection part of the image on the display element 33 is periodically moved (For example, an optical image is shifted between N field and (N+1) field). As a result, resolution on the screen 36 becomes higher than the resolution of the display element 33. For example, if a number of pixels of the display element 33 is ¼ of a number of pixels of HD image, the wobbling element 34 shifts a projection image of the display element 33 along oblique direction as "½ pixel" (a half space between neighboring pixels). In this case, quasi-resolution of the HD image can be realized. Especially, resolution of a central part on the projection image rises.

The projection lens 35 projects an image of the display element 33 onto the screen 36. In the second embodiment, the screen 36 has a spherical surface. However, this surface may be a plain. The signal processing unit 37 generates a display control signal and a wobbling control signal from an image signal output from the image memory 13 and 14. The display control signal is used for controlling the display element driving unit 38. The wobbling control signal is used for controlling the wobbling element driving unit 39. Furthermore, a signal of field image which was already wide-angle transformed is input to the signal processing unit 37. The signal processing unit 37 outputs the signal of field image to the display element driving unit 38. In correspondence with an interval of the field image (field interval Δtf), the signal processing unit 37 generates a signal for wobbling (a signal to regulate shift quantity). The display element driving unit 38 and the wobbling element driving unit 39 respectively drive the display element 33 and the wobbling element 34.

A light radiated from the source of light 31 is transformed into parallel light by the collimator lens 32, and passes through the display element 33 and the wobbling element 34. An image displayed on the display element 33 is projected onto the screen 36 by the projection lens 35.

The aliasing prevention processing unit 21 executes processing to prevent aliasing generated from subsampling, for example, average calculation between pixels along vertical direction on the image. This processing will be explained.

The field subsample processing unit 22 divides the input image (frame) into two interlaced images (field) along the vertical direction or the horizontal direction. Briefly, the frame image is divided into two field images each having low resolution (corresponding to resolution of the display element 33). By wobbling each of the two field images, a frame image having higher resolution than the original frame image is displayed on the screen 36. As a result, resolution of the image on the screen 36 is higher than resolution of the display element 33.

Figure 9:
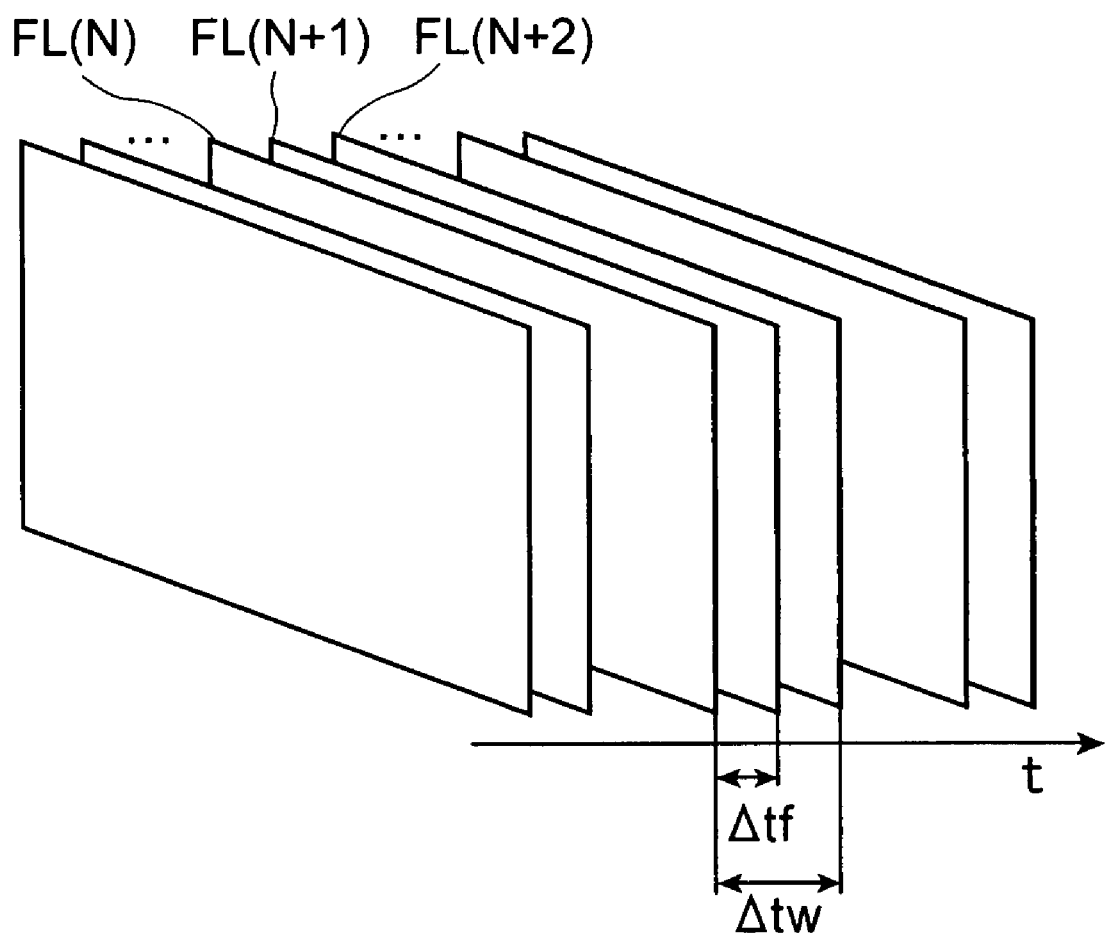
FIG. 9 is a schematic diagram of a plurality of field images.

FIG. 9 is a schematic diagram of a plurality of field images processed by the field subsample processing unit 22. Each of the plurality of field images FL (interlaced-subsampled image) is output at the field interval Δtf. For example, N-field image FL (N) includes pixels of odd numbered scan lines on a frame image, and (N+1)-field image FL(N+1) includes pixels of even numbered scan lines on the frame image. By wobbling the N-field image FL (N) and the (N+1)-field image FL (N+1) at the field interval Δtf, the N-field image FL(N) and the (N+1)-field image FL(N+1) are projected onto the screen

36. As a result, a projected image on the screen 36 has double the resolution (number of pixels) of the original resolution of the display element 33. By mutually wobbling the field image FL(N) and the field image FL(N+1), an interval Δtw (wobbling interval) corresponding to a frame interval is double the field interval Δtf (Δtw=2·Δtf).

If a frame interval Δtf0 of frame images (before subsampling) is twice the field interval Δtf1 of subsampled field images (For example, Δtf0=1/30, Δtf1=1/60), each frame image is output two times at the field interval Δtf1. In this case, two frame images (output two times) are subsampled as a first field image and a second field image. As mentioned-above, the first field image includes pixels of odd numbered scan lines of one of the two frame images, and the second field image includes pixels of even numbered scan lines of the other of the two frame images.

If a frame interval Δtf0 of frame images (before subsampling) is equal to a field interval Δtf1 of subsampled field images, number of units of frame images is subsampled so that the frame interval is double the field interval (In case of "Δtf0=Δtf1=1/60", subsampled frame interval is "1/30"). Then each frame image is subsampled as two field images. In this case, as explained afterwards, the aliasing prevention processing unit 21 is effective.

The wide-angle transformation processing unit 12 transforms the first field image and the second field image based on wide field of view. By wobbling the first field image and the second field image each transformed, resolution rises as two times to four times. Especially, as to a reduced image at a central part on the transformed field image, resolution does not fall.

(Detail Processing of the Aliasing Prevention Processing Unit 21)

The aliasing prevention processing unit 21 filters each frame image along a vertical axis of space direction or a time axis of inter-field direction. As a result, motion pictures of high quality without flicker and disturbance can be replayed.

Figure 10:
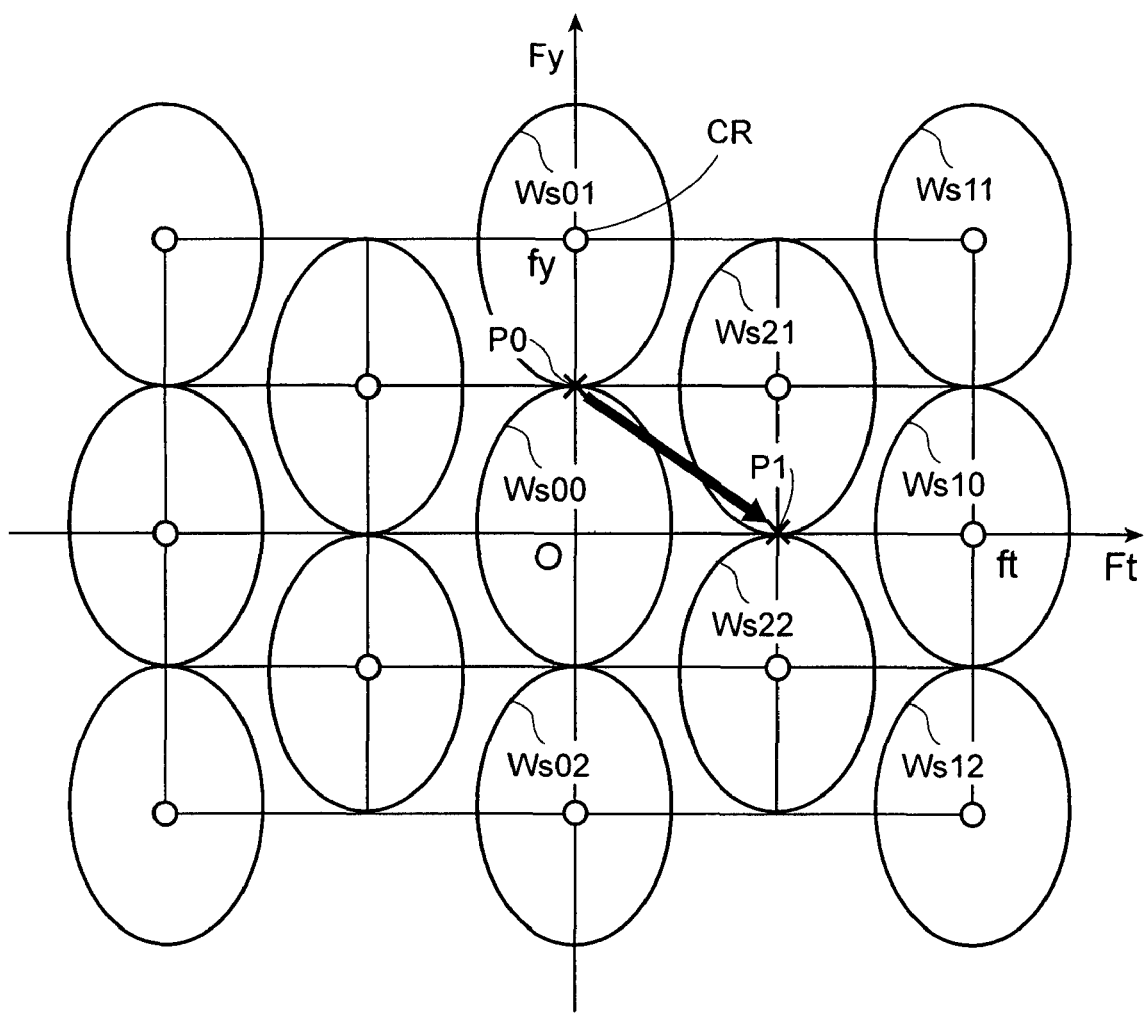
FIG. 10 is a schematic diagram of spatial frequency-analysis of wobbling-displayed image.

FIG. 10 is a schematic diagram representing status that wobbling-displayed image is decomposed by spatial frequency. This image is subsampled by field and scan line. In FIG. 10, a frequency band "Ws" of the field image is represented on coordinates based on frequency "Fy" of the vertical axis and frequency "Ft" of the time axis. Sampling frequency along the vertical axis and the time axis is respectively "fy" (space between scan lines) and "ft" (field period, for example, 60 Hz).

A component Wsy of the frequency band Ws along the vertical axis depends on a magnification of transformation and a frequency band Wy of original field image. If the magnification is ½, the component Wsy decreases (Wsy=½*Wy). If the magnification is n-times, the component Wsy enlarges (Wsy=n*Wy).

In correspondence with a sampling frequency (space between scan lines, interval between frames) along the vertical axis direction and the time axis direction, signals of frequency bands Ws01, Ws02, and Ws10~Ws12 are generated from an original frequency band Ws00. Furthermore, by wobbling, signals of frequency bands Ws21 and Ws22 are generated between frequency bands Ws00~Ws02 and frequency bands Ws10~Ws12. In FIG. 10, a carrier is located at a center of each frequency band Ws.

The reason why signals of frequency bands Ws21 and Ws22 are generated by wobbling is explained. As mentioned-above, a field and a scan line are subsampled from the frame image for wobbling. By subsampling the field and the scan line, a career of frequency as a half of each sampling frequency along the vertical axis direction and the time axis direction is generated. Briefly, in FIG. 10, signals of frequency bands Ws21 and Ws22 (career position (±½ fy, ±½ ft)) shifted from original frequency band Ws00 along the vertical axis direction and the time axis direction are generated.

By wobbling processing, a point P1 (0,½ ft) corresponding to a point P0 (½ ft,0) is generated (aliasing of frequency). Briefly, a signal element (point P0) having a high frequency along the vertical axis direction and a low frequency along the time axis direction is changed to a signal element (point P1) having a low frequency along the vertical axis direction and a high frequency along the time axis direction.

In the first embodiment, a frequency of the point P1 along the time axis is "ft/2=60/2=30 Hz". Accordingly, a viewer recognizes a flicker on the image. In order to reduce the flicker, generation of signal element corresponding to the point P0 (½ fy,0) should be restricted. This is a function of the aliasing prevention processing unit 21. The aliasing prevention processing unit 21 is a filter to cut a signal element above ½ fy along the vertical axis direction from a frame image (before field-subsampling). As a result, for example, generation of signal element corresponding to the point P0 (½ fy,0) is restricted.

In order to quantitatively understand flicker prevention effect by the aliasing prevention processing unit 21, we simulated using CZP (Circular Zone Plate chart). The CZP is a concentric circular figure which a difference between radiuses of neighboring concentric circles becomes smaller in order from an inner circle to an outer circle.

Figure 11:
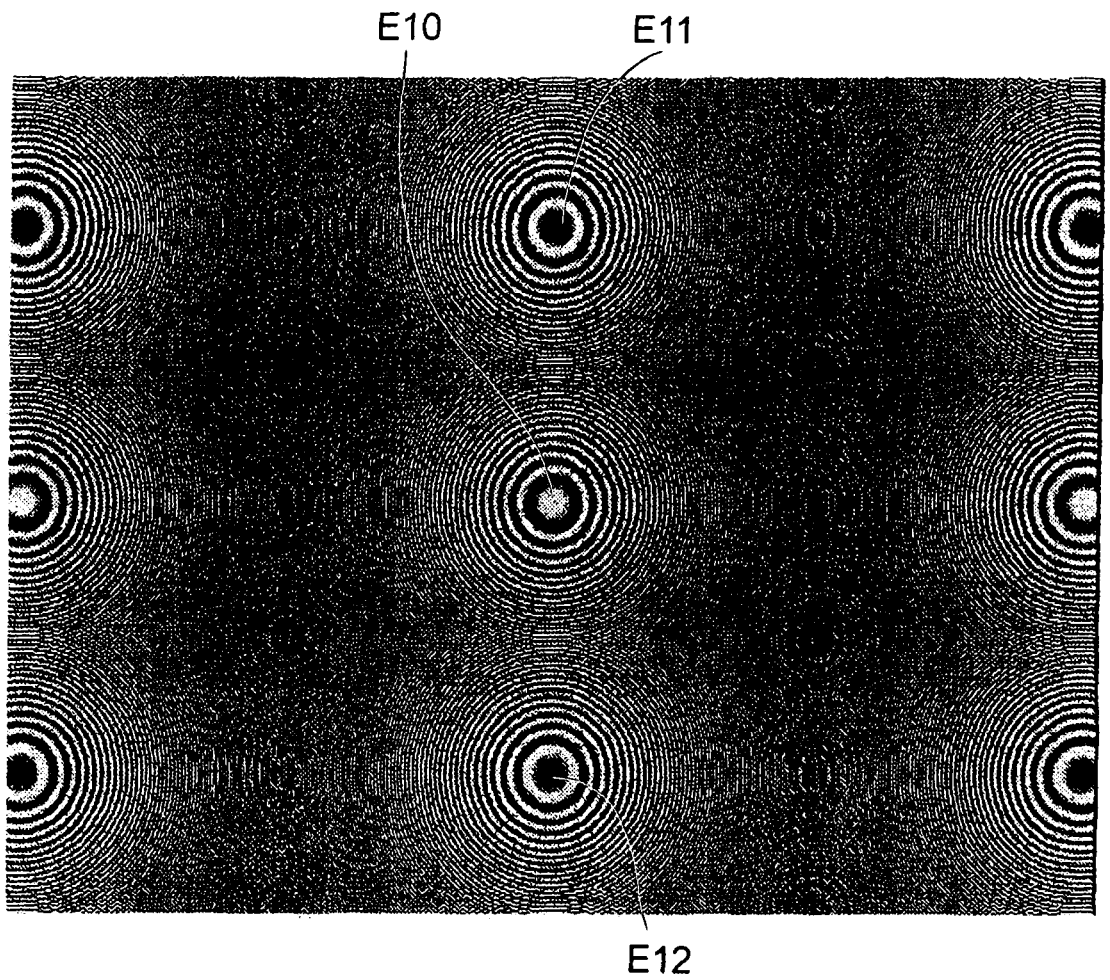
FIG. 11 is an example of aliasing of field-subsampled CZP image.
Figure 12:
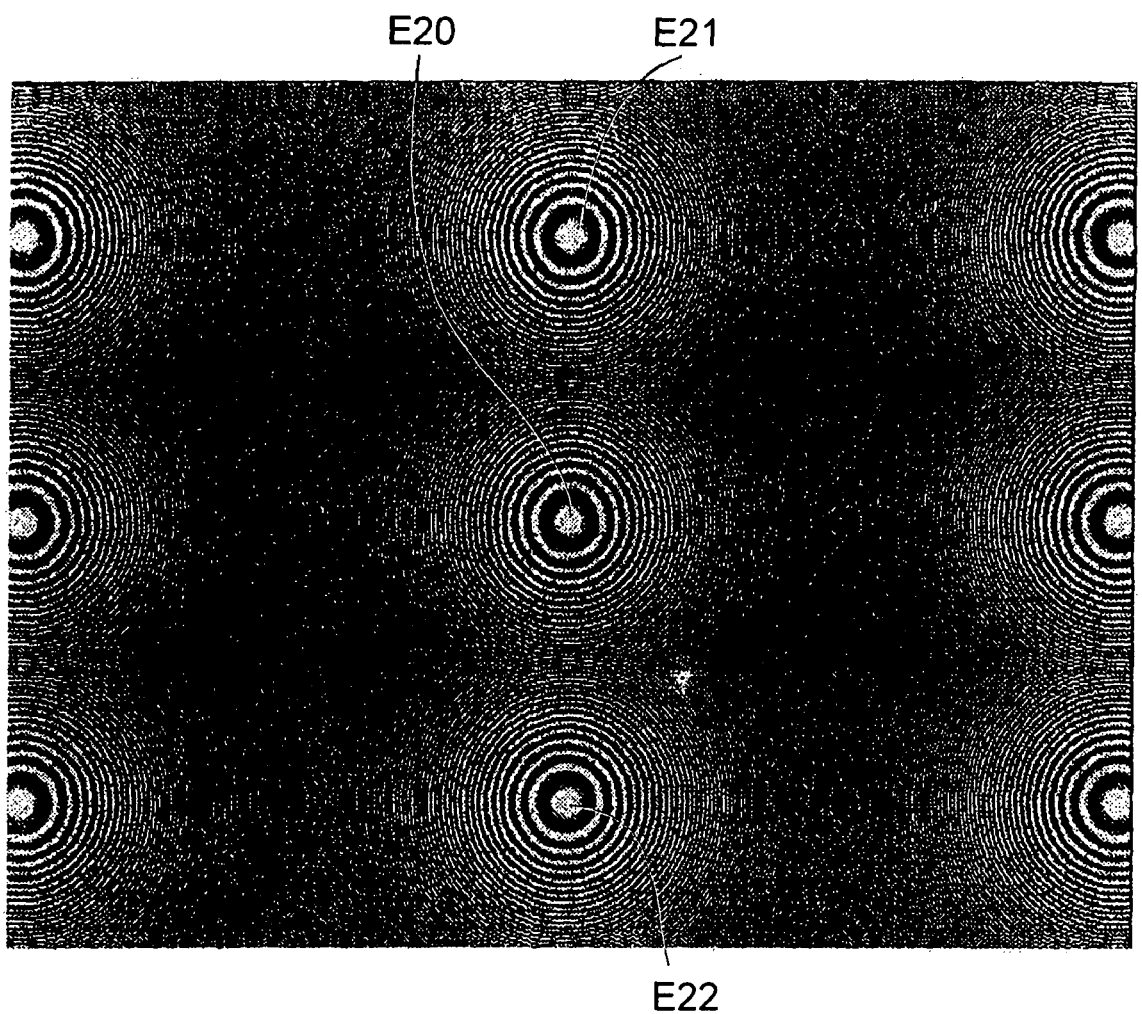
FIG. 12 is another example of aliasing of field-subsampled CZP image.

Hereinafter, by subsampling a field and a scan line from CZP-motion image (by preprocessing for wobbling), generation of flicker is shown. FIGS. 11 and 12 are concrete examples of N-field image and (N+1)-field image each including aliasing in case of field-subsampling CZP image. These are simulation result of predetermined field images in condition of non-filtering.

In FIG. 11, patterns E11 and E12 generate on top and bottom of the field image. The patterns E11 and E12 are very clear, and have reverse-phase for a central pattern E10. Concretely, the patterns E11 and E12 have a black eye while the central pattern E10 has a white eye. In FIG. 12, patterns E21 and E22 generate on top and bottom of the field image. The patterns E21 and E22 have the same phase as a central pattern E20. Concretely, the patterns E21 and E22 have a white eye same as the central pattern E20. In this way, light and darkness are reversed between patterns (E11,E12) and patterns (E21,E22). Accordingly, repeat of the light and darkness is recognized as flicker. A space between flickers is double the field interval Δtf (If a field frequency is 60 Hz, a flicker frequency is 30 Hz).

The aliasing prevention processing unit 21 cuts signal elements of ½ fy along the vertical axis direction. As a result, the flicker is reduced. The following expressions (14)~(16) are represented as three digital filters LPF1~LPF3. In this case, one pixel delay along the vertical axis direction is described as "Zy".

$$Y1(Zy) = \{(1+Zy^{-1})/2\}X(Zy) : LPF1 \tag{14}$$

$$Y2(Zy) = \{(2+Zy^{-1})/3\}X(Zy) : LPF2 \tag{15}$$

$$Y3(Zy) = \{(Zy+2+Zy^{-1})/4\}X(Zy) : LPF3 \tag{16}$$

Figure 13:
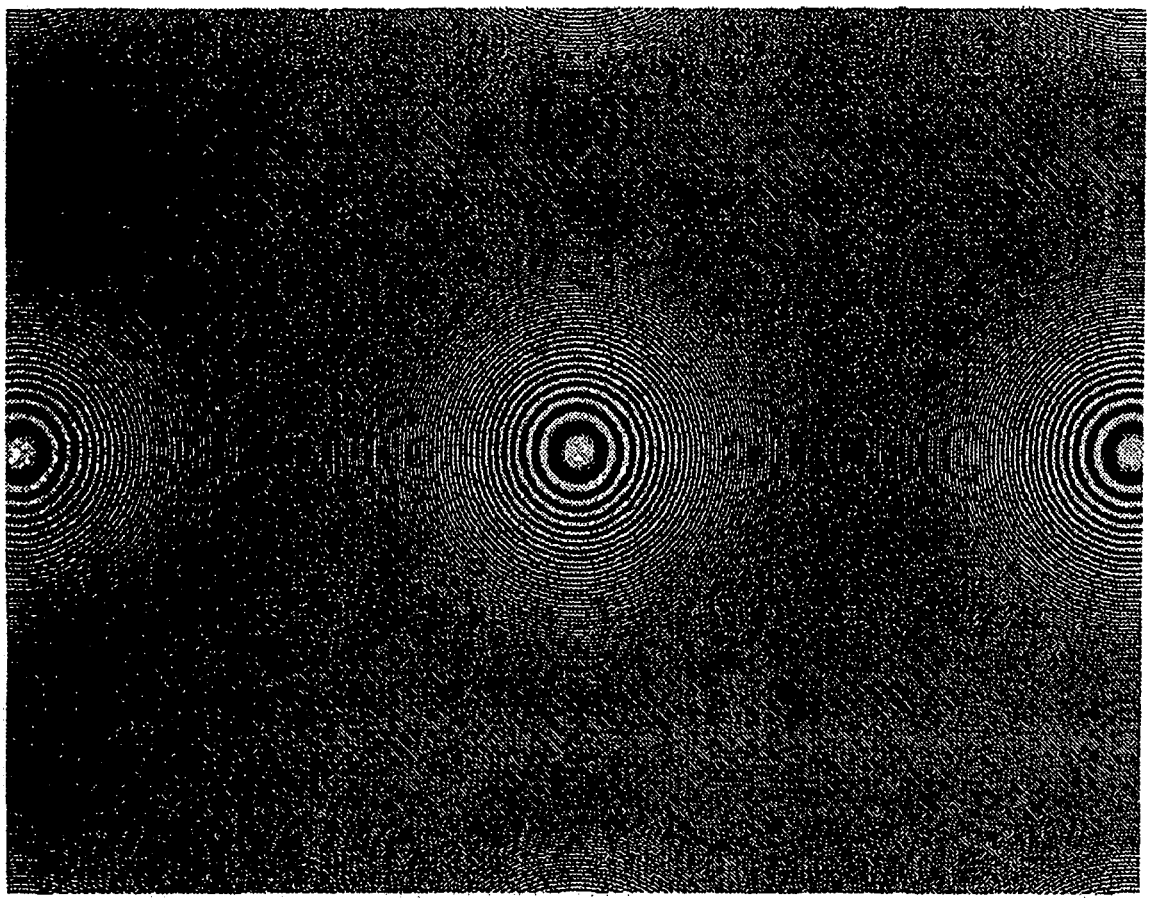
FIG. 13 is an example of field-subsampled image after aliasing-prevention processing by a first filter.
Figure 14:
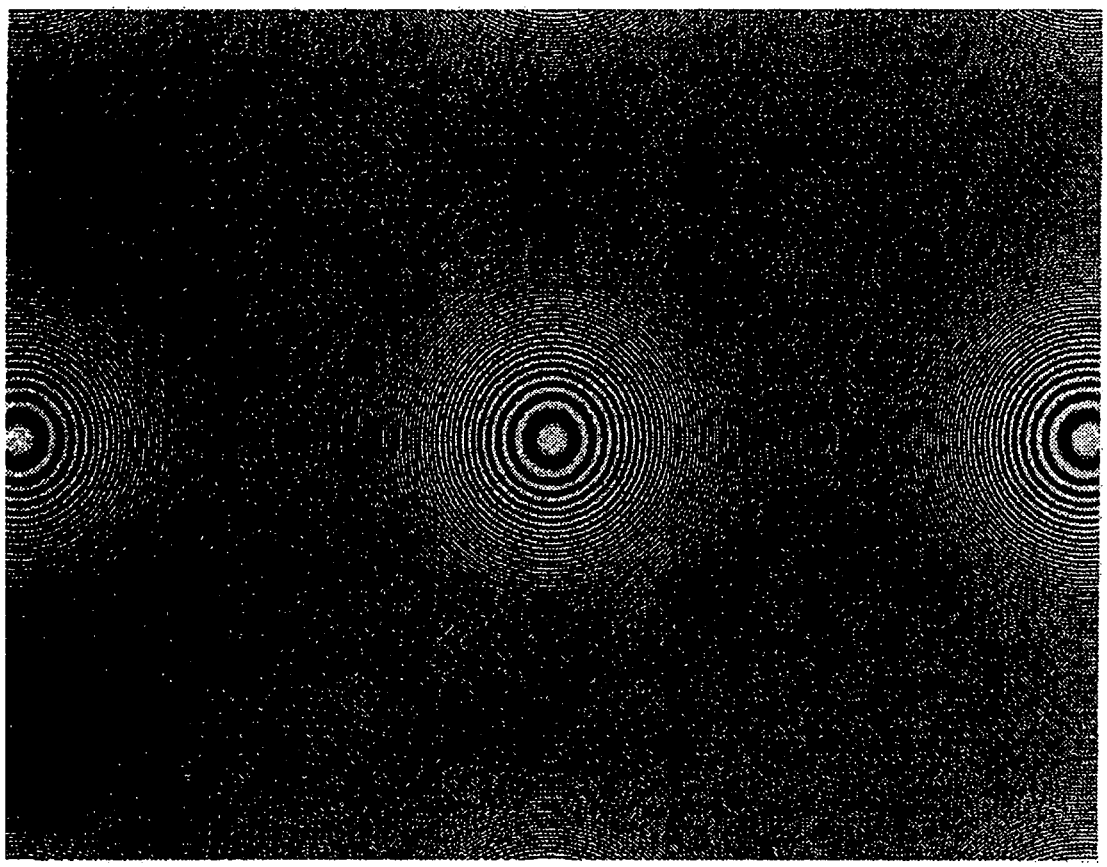
FIG. 14 is an example of field-subsampled image after aliasing-prevention processing by a second filter.
Figure 15:
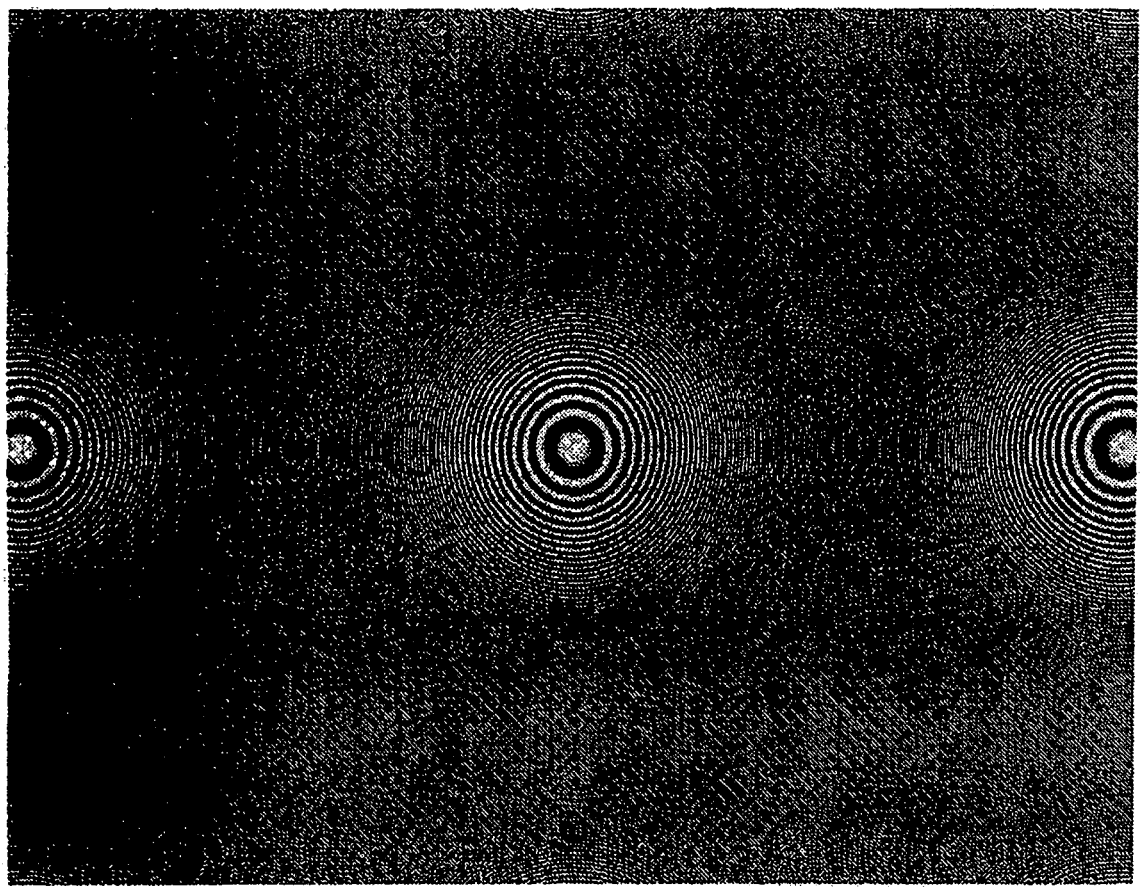
FIG. 15 is an example of field-subsampled image after aliasing-prevention processing by a third filter.

FIGS. 13~15 show examples of CZP images from which field is subsampled after aliasing prevention processing by filters LPF1~LPF3. As shown in FIGS. 13~15, the CZP image processed by the filter LPF3 has the smallest aliasing. Furthermore, in evaluation result using an ordinary image, it is confirmed that a flicker by aliasing is greatly reduced by the filter LPF3.

In above expressions (14)~(16), filters LPF1~LPF3 are represented as a function in frequency space. However, in following expressions (17)~(19), the filters LPF1~LPF3 can be represented as addition-subtraction of brightness Lu of pixels.

$$Lu(x,y)=\{Lu(x,y)+Lu(x,y-1)\}/2:LPF1 \quad (17)$$

$$Lu(x,y)=\{2*Lu(x,y)+Lu(x,y-1)\}/3:LPF2 \quad (18)$$

$$Lu(x,y)=\{Lu(x,y+1)+2*Lu(x,y)+Lu(x,y-1)\}/4:LPF3 \quad (19)$$

In above expressions (17)~(19), "(x,y)" corresponds to a pixel position which is represented by a number of pixels from the origin O along the vertical axis direction and the horizontal axis direction. Briefly, the expressions (17)~(19) mean average calculation between pixels along the vertical axis direction (pixels on different scan lines).

"Lu (x,y)" represents brightness of a pixel positioned on (x,y), and includes color of the pixel if the position has color information. For example, as a sum of brightness Lr of Red, brightness Lg of Green, and brightness Lb of Blue, "Lu(x,y)" is represented as "(Lr(x,y), Lg(x,y), Lb(x,y))".

In the same way as filtering along the vertical axis direction, filtering along a time axis direction can be executed. Briefly, by average calculation between pixels along the time axis direction (pixels on different frames), flicker is reduced. For example, a filter LPF4 to cut an element (flicker) of time frequency ½ ft (30 Hz) is represented as follows.

$$Lu(x,y,t)=\{Lu(x,y,t)+Lu(x,y,t-1)\}/2:LPF4 \quad (20)$$

In above expression (20), time "t" is represented based on a field interval 2*Δtf. Briefly, the expression (20) means average calculation between a pixel of present frame and a corresponding pixel (same position as the pixel) of the previous frame.

The aliasing prevention processing unit 21 may execute average processing along the vertical axis direction and along the time axis direction in order to further reduce the aliasing. In a frequency space, assume that a filter along the vertical axis direction is Y(Zy) and a filter along the time axis direction is T(Zt). Time-space filter characteristic F(Zy,Zt) that applies both filters Y(Zy) and T(Zt) is represented as following expression (21).

$$F(Zy,Zt)=Y(Zy)*T(Zt) \quad (21)$$

For example, a filter LP5 combined by filters LP1 and LP4 is represented as following expression (22).

$$Lu(x,y,t)=\{Lu(x,y,t)+Lu(x,y-1,t)+Lu(x,y,t-1)+Lu(x,y-1,t-1)\}/4:LPF5 \quad (22)$$

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software) such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for displaying an image, comprising:
an image display unit including a display region having a higher resolution than a number of pixels of the image;
a base information storage unit configured to store viewing position information of a viewer, and size information of the display region; and
a wide-angle transformation unit configured to calculate a central area including a viewing center of the viewer of the display region using the viewing position information and the size information, to divide the image into a first pixel area corresponding to the central area and a second pixel area corresponding to a peripheral area other than the central area, and to transform the first pixel area and the second pixel area by magnifying, a magnification ratio of the first pixel area being less than a magnification ratio of the second pixel area;
wherein the image display unit displays an image including the transformed first pixel area and the transformed second pixel area.

2. The apparatus according to claim 1, further comprising:
an image storage unit configured to store a plurality of images each corresponding to a frame;
a first image memory and a second image memory, each configured to alternatively store images from the plurality of images in the image storage unit in order of frame sequence by the wide-angle transformation unit.

3. The apparatus according to claim 2, further comprising:
a first switch to connect one of the first image memory and the second image memory to the wide-angle transformation unit; and
a second switch to connect the other of the first image memory and the second image memory to the image display unit;
wherein the first switch and the second switch change over in order of frame sequence.

4. The apparatus according to claim 1, wherein
the viewing position information includes a viewing point of the viewer based on the origin of the display region, and
the size information includes the resolution, and a horizontal length and a vertical length of the display region.

5. The apparatus according to claim 4, wherein
the wide-angle transformation unit calculates the viewing center on the display region using the viewing point, and the horizontal length and the vertical length of the display region, and calculates a left side length, a right side length, a top side length, and a bottom side length from the viewing center on the display region.

6. The apparatus according to claim 5, wherein the wide-angle transformation unit respectively calculates a left side field of view, a right side field of view, a top side field of view, and a bottom side field of view using the left side length, the right side length, the top side length, the bottom side length, and a distance between the viewing point and the display region.

7. The apparatus according to claim 6, wherein, if at least one of the left side field of view, the right side field of view, the top side field of view, and the bottom side field of view is above 30°, the wide-angle transformation unit sets the central area centered around the viewing center within a radius of 30° on the display region.

8. The apparatus according to claim 7, wherein the wide-angle transformation unit sets the magnification ratio of the first pixel area corresponding to the central area as a first value not above 1.

9. The apparatus according to claim 8, wherein the wide-angle transformation unit sets the magnification ratio of the second pixel area corresponding to the peripheral area as a second value not below 1.4 times the first value.

10. The apparatus according to claim 9, wherein, when the wide-angle transformation unit magnifies each pixel position of the second pixel area, the wide-angle transformation unit interpolates a new pixel between each pixel of the second pixel area based on the magnification ratio.

11. The apparatus according to claim 9, wherein a ratio of a transformed pixel area of the first pixel area to the display region is less than a ratio of the first pixel area to the image.

12. The apparatus according to claim 2, wherein the image display unit includes a source of light to radiate a light, a display element to display the image by the light, a wobbling element to wobble the image from the display element, a projection lens to project the image from the wobbling element, and a screen to display a projected image from the projection lens.

13. The apparatus according to claim 12, further comprising:
a field subsample unit configured to divide each frame image into a first field image and a second field image, the first field image being odd numbered scan lines of pixels, and the second field image being even numbered scan lines of pixels.

14. The apparatus according to claim 13, wherein the wobbling element periodically shifts an optical path of each pixel of the first field image and each pixel of the second field image at a half frame interval.

15. The apparatus according to claim 14, wherein a shift quantity of each pixel is a half space between neighboring pixels of scan lines along a diagonal direction on the frame.

16. The apparatus according to claim 15, further comprising:
an aliasing prevention unit configured to calculate an average of two pixel values of a first pixel on a scan line of the frame, and a second pixel vertically adjacent to the first pixel on a next scan line of the frame before subsample processing of the field subsample unit.

17. The apparatus according to claim 16, wherein the aliasing prevention unit calculates an average of two pixel values of a third pixel on a frame and a fourth pixel at the same position as the third pixel on a previous frame before subsample processing of the field subsample unit.

18. The apparatus according to claim 17, wherein the aliasing prevention unit calculate an average of four pixel values of the first pixel on the scan line of the frame, the second pixel vertically adjacent to the first pixel on the next scan line of the frame, a fifth pixel at the same position as the first pixel on a previous frame, and a sixth pixel at the same position as the second pixel on the previous frame before subsample processing of the field subsumple unit.

19. A method for displaying an image on a display region having a higher resolution than a number of pixels of the image, comprising:
storing viewing position information of a viewer, and size information of the display region;
calculating a central area including a viewing center of the viewer of the display region using the viewing position information and the size information;
dividing the image into a first pixel area corresponding to the central area and a second pixel area corresponding to a peripheral area other than the central area;
transforming the first pixel area and the second pixel area by magnifying, a magnification ratio of the first pixel area being less than a magnification ratio of the second pixel area; and
displaying an image including the transformed first pixel area and the transformed second pixel area.

20. A computer readable medium that stores a computer program for causing a computer to display an image on a display region having a higher resolution than a number of pixels of the image, the computer program comprising:
a first program code to store viewing position information of a viewer, and size information of the display region;
a second program code to calculate a central area including a viewing center of the viewer of the display region using the viewing position information and the size information;
a third program code to divide the image into a first pixel area corresponding to the central area and a second pixel area corresponding to a peripheral area other than the central area;
a fourth program code to transform the first pixel area and the second pixel area by magnifying, a magnification ratio of the first pixel area being less than a magnification ratio of the second pixel area; and
a fifth program code to display an image including the transformed first pixel area and the transformed second pixel area.

* * * * *